FIG. I

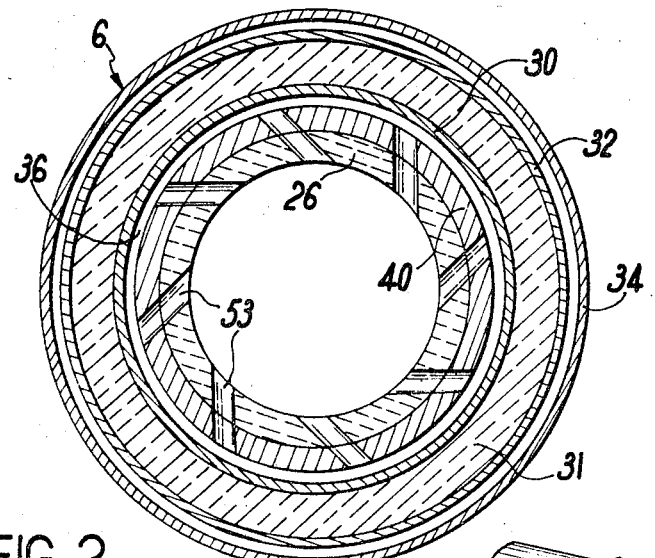
FIG. 2
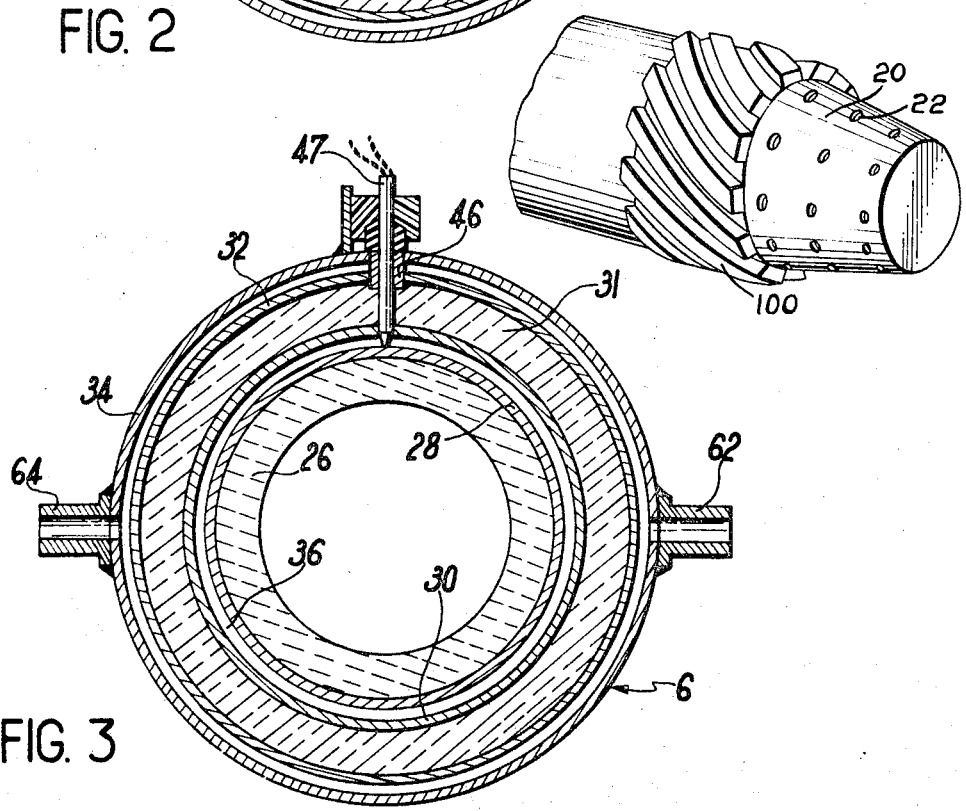
FIG. 6
FIG. 3

United States Patent Office 3,424,541
Patented Jan. 28, 1969

3,424,541
FLUID FUEL BURNER
Robert Wang, Varsovie, Poland, and David Yerouchalmi, Issy-les-Moulineaux, France, assignors to Commissariat à l'Energie Atomique, Paris, France
Filed July 28, 1967, Ser. No. 656,888
Claims priority, application France, Aug. 10, 1966, 72,736
U.S. Cl. 431—158
Int. Cl. F23r 1/08
3 Claims

ABSTRACT OF THE DISCLOSURE

A fluid fuel burner using a combustion-supporting agent formed by heated air enriched with oxygen, is adapted to deliver combustion gases at elevated temperature and high outlet speed, the burner being formed by a conical head, a cylindrical combustion chamber and a convergent member, the head of the burner comprising an injector disposed in the burner axis to feed fuel and primary combustion-supporting agent (oxygen).

---

Figure 1:
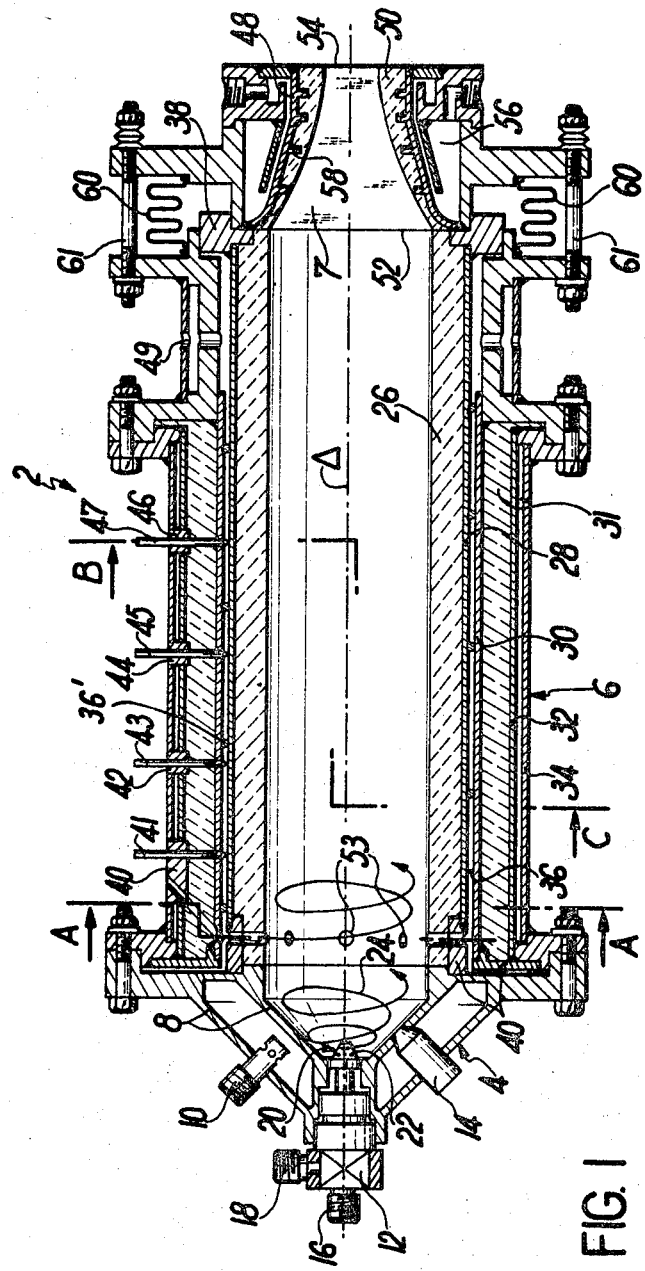

This invention relates to a fuel burner of medium thermal power adapted to feed more particularly an MHD conversion nozzle, the burner comprising a conical head, a cylindrical combustion chamber and a convergent portion.

Burners of this kind often have a sparking plug which becomes worn as a result of radiation and is contaminated by carbon deposits. Since the mixture of fuel, combustion-supporting agent and alkaline injection agent is not given adequate movements, the ignition device must be kept operating as long as the burner operates.

The structure of the walls of the combustion chamber and convergent portion of the prior art burners will not allow prolonged operation, which causes considerable energy losses and deterioration of the refractory walls.

If the refractory lining is eliminated, a combustion chamber and a convergent portion can be used whose walls are made of metal cooled by water. Obviously, there is a considerable proportion of thermal losses, of the order of 15% of the total flow, more particularly in the case of a laboratory MHD nozzle. Moreover, deposits of alkaline metal on the metal walls have a highly corrosive effective in prolonged operation.

If, on the contrary, use is made of refractory lining, the melting of the first very hot layers of the refractory material and the viscous slag which ultimately forms reduce the life of the refractory lining, which otherwise has the advantage of preserving almost all the initial thermal power.

The burner according to the invention obviates the aforementioned disadvantages by using a combustion-supporting agent formed by heated air enriched with oxygen, and being adapted to deliver combustion gases at elevated temperature and high outlet speed.

According to the invention the burner includes an injector disposed in the axis of the burner for feeding fuel and primary combustion-supporting agent. The injector has a conical head formed with tangential apertures with axes perpendicular to the burner axis. The primary combustion-supporting agent is introduced through the injector by means of helical grooves with which its outer surface is formed. The burner head comprises an ignition device formed by a rare gas plasma torch supplied with current, and an injector for an injection agent.

The combustion chamber is constructed by way of compromise between the two extreme constructions discussed hereinbefore. The chamber is cylindrical, its inner wall being formed by refractory cement deposited on a steel cylinder enclosing a second cylindrical wall coaxial with the first wall. The two walls bound an annular passage in which there is a circulation, from the convergent portion to the head, of the cooling air acting as a secondary combustion-supporting agent which enters the combustion chamber through injection apertures distributed over the cement inner wall adjacent the burner head. The cooling air circulating between the two cylindrical steel walls is guided by a helical wire welded to one of the walls.

The combustion chamber also comprises a third and a fourth cylindrical wall coaxial with the first two walls, a thermal insulating agent being disposed between the second and third walls, while the two latter walls bound an annular conduit through which the cooling water flows.

The burner as briefly described above can be fed with gaseous fuel (propane, natural gas, producer gas, etc.) or liquid fuel (kerosene, fuel oil, etc.), the combustion-supporting agent being heated air enriched with oxygen in variable proportions, the result being combustion gases of elevated temperature and having adequate outlet speeds to feed combustion gas to an energy-converting nozzle. The combustion gas vehicles an alkaline injection agent formed by a potassium salt in aqueous solution or in the form of a powder dispersed by gas pressure.

The ignition, for instance by an argon plasma torch, is connected to a continuous supply circuit and can be remotely controlled. Since the plasma jet has a very high temperature almost immediately, it instantaneously ignites the burner. Moreover, since the fuel gas and combustion-supporting agent are supplied tangentially, they are given considerable turbulence in the burner head and the inlet to the combustion chamber. The result is an eddying of the gases in the burner axis, which prevents the plasma torch from continuing to operate after a brief operating period, while ensuring great reliability.

Lastly, the structure of the combustion chamber and convergent portion enable operations of very long duration to be performed. The heat flow losses are very low and the refractory walls remain in an excellent state.

Figure 4:
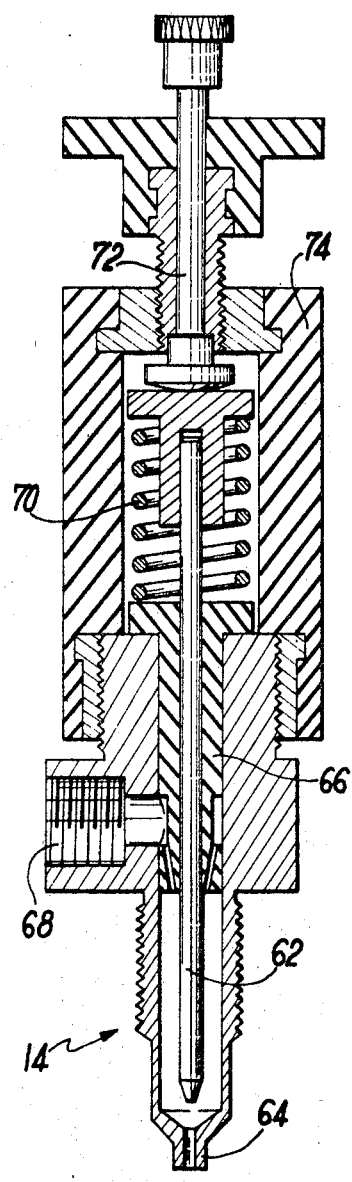
Figure 5:
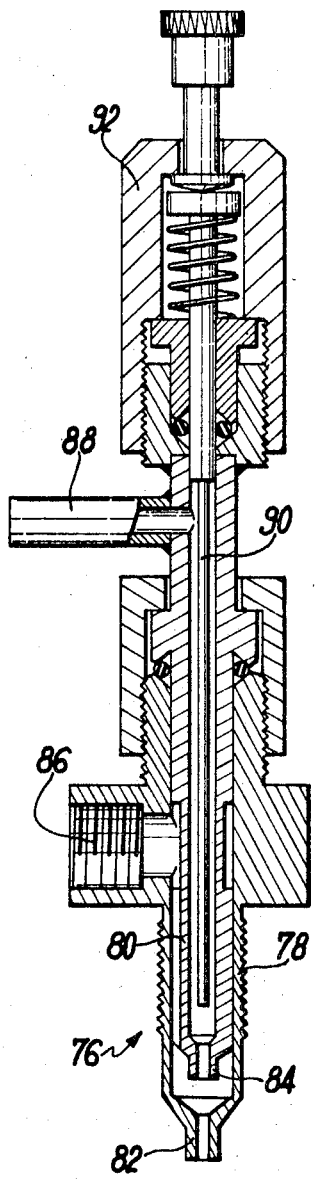

The invention will now be described by way of example with reference to the accompanying drawings in which:

FIG. 1 is an overall view of a burner according to the invention used to supply an MHD nozzle, FIGS. 2 and 3 are cross-sections through the burner combustion chamber, taken along the lines A—A and B—C in FIG. 1, FIG. 4 shows the argon plasma ignition device, FIG. 5 shows the injector for the alkaline injection agent, and FIG. 6 is an enlarged detail of the injector of FIG. 1.

Referring to FIG. 1, a medium power burner 2 uses as its fuel propane, while the combustion-supporting agent is air enriched with oxygen. The burner 2 is of conventional construction, having a conical head 4, a cylindrical combustion chamber 6 and a convergent portion 7 enabling a transition to be made between the circular cross-section of the chamber 4 and a differently shaped cross-section, for instance a rectangular one, the burner being adapted to feed an MHD nozzle.

The conical head of the burner has an opening angle of 90° and is made of copper, having a double wall 8 enabling the head to be cooled by a flow of water injected at 10. The conical head comprises, disposed in the burner axis, an injector 12 for the introduction of a gaseous fuel (propane) and the primary combustion-supporting agent (oxygen), an ignition device 14 (FIG. 4) formed by a plasma torch as a rule disposed on the double wall, and one or more injectors (not shown in FIG. 1) for an alkaline injection agent.

The gaseous fuel (propane) is delivered to the inlet of an axial conduit of the injector 12 at a place 16, the primary combustion-supporting agent (oxygen) being supplied at a place 18 and moving along helical grooves with which the injector surface is formed.

The injector head 20 is formed with tangential apertures 22 having axes which are strongly inclined to the radial planes and are substantially perpendicular to the burner axis. Injector head 20 also includes helical grooves 100 through which the primary combustion-supporting agent passes into the cylindrical combustion chamber. As a result of the special arrangement of the injection apertures, the molecules of the mixture formed by the fuel and the primary combustion-supporting agent enter the burner by describing trajectories 24 in the form of conical helixes. The two gases enter the burner, forming eddies so that intimate mixing occurs almost immediately on injection. This mixture then passes over the inner surface of the head 4 where the ignition device is disposed.

The cylindrical burner chamber 6 has a composite structure, its refractory cement inner wall 26 being cast inside a steel cylinder 28. The chamber 6 also comprises three coaxial steel cylindrical walls 30, 32 and 34, the wall 30, which is at a relatively small distance from the first-mentioned rust-resistant steel wall 28, cooperates therewith to bound an annular passage 36 in which there is a circulation, from the convergent portion to the head, of the cooling air. The walls 30, 32 further away than the preceding walls, enclose between them a layer of thermal insulating agent 31. Lastly, the outer wall 34 bounds together with the previous wall 32 an annular passage for the cooling water. The inner wall 26 is formed by a refractory cement pisé of high thermal and chemical resistance, the pisé lining, as already explained, the inside of a rust-resistant steel cylinder 28 comprising anchoring devices for the better attachment of the cement. The assembly of walls 26 and 28 is retained in its correct position by assembly rings 38 and 40 used to retain the various elements of the combustion chamber in their correct positions relatively to one another.

The cooling air circulating between the cylinders 28 and 30 in the passage 36 is used as a secondary combustion-supporting agent, and to this end enters the combustion chamber through apertures 53 with which the assembly ring 40 and the walls 26 and 28 are formed adjacent the head 4. The apertures 53 are strongly inclined to the radial planes. The cooling air enters the passage 36 through apertures 49 with which the end of the cylinder 32 is formed.

In the annular passage 36 the air circulation is guided by a rust-resistant steel wire 36' welded in the form of a helix to the cylinder 28. This step increases the contact surface between the air and the wall and thus makes the heat exchanges more effective.

Both the burner head and the convergent portion are attached to the combustion chamber by bearing against the assembly of steel envelopes 32, 34. The two envelopes have passages 40, 42, 44, 46 receiving four thermocouples 41, 43, 45 and 47 for measuring the temperature of the wall 26.

The convergent portion 7 comprises a metallic member 48 lined with a refractory pisé 50 of a nonuniform thickness which increases from a circular inlet 52 in the direction of a rectangular outlet 54. Water circulates through a chamber 56 enclosing the convergent portion 7 so as to cool it intensely and evenly.

In this case also, anchoring devices taking the form of rings 58 welded to the inside of the metallic portion strengthen the mechanical behaviour of the pisé. The convergent portion 7 is attached to elements which bear against the last walls 30, 32, 34 via a spring formed by resilient washers 60 mounted on screwthreaded tightening rods 61.

FIGS. 2 and 3 are sections through the combustion chamber, taken along the lines A—A and B—C in FIG. 1 respectively. The first cross-section is taken along the plane of the axes of the apertures in the assembly ring 40. The cylindrical walls forming the combustion chamber 6 can be seen, except for the steel wall 28. Clearly, the apertures 53 are strongly inclined to the radial planes.

The second cross-section B—C shows all the walls forming the chamber, one 47 of the thermocouples for measuring the temperature of the refractory lining 24 also being shown. Lastly, note will be taken of the arrangement of the cooling water inlet 62 and outlet 64 on either side of the chamber in the same axial horizontal plane. The ignition device is shown in longitudinal axial section in FIG. 4, as already explained. This member is a plasma torch, fed, for instance, with argon.

The drawings show a cathode 62 formed by a tungsten rod, and a coaxial copper anode 64. The two electrodes are retained in the correct relative positions by an insulating member 66 acting as a distributor for argon supplied at a place 68 via an inlet with which the anode is formed. A mechanical device which comprises spring 70 and a pusher 72 and is rigidly connected to the electrodes via an insulating member 74 enables the cathode to be displaced in relation to the anode. The torch is ignited either by short-circuiting the electrodes, or by high voltage discharges.

An injector 76 for an injection agent (not shown in FIG. 1) is shown in FIG. 5, the injector comprising two axial members 78, 80 terminating in concentric tubes 82, 84 through which there escape respectively compressed air injected at a place 86, and an aqueous solution of potassium salts injected at a place 88. When it leaves the small outlet tube 84, the carbonated water jet is dispersed into droplets by the jet of compressed air. The member has a needle 90 which can be displaced longitudinally and can enter the tubes 82, 84 to close their outlets if necessary without interrupting operations. A spring pusher 92 enables the needle 90 to be operated readily.

The applicants have produced a burner according to the invention having a mean power of 100 kw., the outlet cross-section of the convergent portion being 1.5 x 2.5 cm.$^2$.

A voltage of 70 v. is applied to the electrodes of the ignition device before its operation. When operating, it delivers in short-circuit 25 amps, the argon consumption being 1–1.5 kg. per hour.

The alcoholic potassium solution delivered to the injector is subjected to a pressure of 3–5 kg. The temperature of the gases at the outlet is 2,500° K., the outlet speed being 500 m./sec.

We claim:
1. A fluid burner using a combustion supporting agent formed by heated air enriched with oxygen and adapted to deliver combustion gases at elevated temperature and high outlet speed comprising a conical head, a cylindrical combustion chamber and a convergent member, an injector for said conical head disposed in the burner axis for feeding fuel and primary combustion supporting agent, the combustion chamber being cylindrical, its inner wall being formed by refractory cement deposited on a rust-resistant steel cylinder enclosing a second cylindrical steel wall coaxial with the first wall, and the two walls bound an annular passage in which there is a circulation, from the convergent member to the burner head, of cooling air acting as a secondary combustion-supporting agent and entering the combustion chamber through injection apertures distributed over the surface of the combustion chamber inner wall.

2. A fluid fuel burner as set forth in claim 1, characterised in that the cooling air moving between the two cylindrical walls of the combustion chamber is guided by a helical wire welded to one of the walls.

3. A fluid fuel burner as set forth in claim 1, characterised in that the combustion chamber comprises a third and a fourth coaxial cylindrical steel wall, a heat insulating agent being disposed between the second and third walls, while the two latter walls bound an annular conduit through which the cooling water flows.

References Cited
UNITED STATES PATENTS

| | | | |
|---|---|---|---|
| 2,960,594 | 11/1960 | Thorpe | 158—27.4 |
| 3,224,486 | 12/1965 | Geller et al. | 158—4 |
| 3,247,884 | 4/1966 | McFadden et al. | 158—7 |
| 3,344,834 | 10/1967 | Feinman et al. | 158—4 |

CHARLES J. MYHRE, *Primary Examiner.*

EDWARD G. FAVORS, *Assistant Examiner.*